US009787844B2

(12) United States Patent
Rey

(10) Patent No.: US 9,787,844 B2
(45) Date of Patent: Oct. 10, 2017

(54) CONFERENCE BRIDGE SERVER

(75) Inventor: Jean-Francois Rey, Brest (FR)

(73) Assignee: Alcatel Lucent, Boulogne-Billancourt (FR)

( * ) Notice: Subject to any disclaimer, the term of this patent is extended or adjusted under 35 U.S.C. 154(b) by 3321 days.

(21) Appl. No.: 11/752,607

(22) Filed: May 23, 2007

(65) Prior Publication Data

US 2008/0031437 A1 Feb. 7, 2008

(30) Foreign Application Priority Data

Aug. 1, 2006 (EP) ..................................... 06291250

(51) Int. Cl.
*H04M 3/42* (2006.01)
*H04M 3/56* (2006.01)
(Continued)

(52) U.S. Cl.
CPC ............. *H04M 3/56* (2013.01); *H04M 3/562* (2013.01); *H04M 7/006* (2013.01)

(58) Field of Classification Search
CPC ........ H04M 3/56; H04M 3/568; H04M 3/563; H04M 3/567; H04M 3/565; H04M 3/564; H04M 2203/5063; H04M 3/382; H04M 2203/5009; H04M 2203/5054; H04M 3/42348; H04L 12/1818; H04L 65/403;
(Continued)

(56) References Cited

U.S. PATENT DOCUMENTS 5,983,192 A * 11/1999 Botzko et al. ................. 704/500
6,621,834 B1 * 9/2003 Scherpbier et al. .......... 370/532
(Continued)

FOREIGN PATENT DOCUMENTS

WO WO 02/056193 A1 7/2002
WO WO 2005/036878 A1 4/2005
WO WO 2005/107211 A1 11/2005

*Primary Examiner* — Ahmad F Matar
*Assistant Examiner* — Kharye Pope
(74) *Attorney, Agent, or Firm* — Fay Sharpe, LLP

(57) ABSTRACT

The invention concerns a conference bridge server (30) for establishing a conference telephone call, and a corresponding method and a computer program product. The conference bridge server (30) comprises input and output means (31, 33) for a plurality of communication connections connecting conference terminals (11 to 16, 20) with the conference bridge server (30) and a conference core (32) for distributing input signals from conference terminals (11 to 16, 20) to at least some of the remaining conference terminals (11 to 16, 20). The conference bridge server (30) comprises means for issuing a special address to be utilized, by one or more participants (111 to 116) at a first location (1) using a common conference phone (10), to connect one or more laptop computers (11 to 16) as additional conference terminals (11 to 16). Said conference core (32) is programmed to distribute, in said conference call, input signals from conference terminals (11 to 16) connected via said special address to conference terminals (20) assigned to other participants (200) at one or more other locations (2). At the same time, said conference core (32) is programmed to redirect output signals destined for conference terminals (11 to 16) connected via said special address to said common conference phone (10).

10 Claims, 6 Drawing Sheets

(51) Int. Cl.
  *H04M 7/00* (2006.01)
  *H04L 12/66* (2006.01)
(58) Field of Classification Search
  CPC ............ H04L 12/1827; H04L 65/4038; H04L
    12/1822; H04L 65/1069; H04L 67/24;
    H04L 65/1046
  USPC ....... 370/261, 352, 389, 353, 354, 355, 356,
    370/357, 263, 264, 265, 270, 271, 262;
    379/202.01, 406.01, 203.01, 204.01,
    379/205.01, 206.01; 455/416; 709/204,
    709/205, 206, 207
  See application file for complete search history.

(56) References Cited

U.S. PATENT DOCUMENTS

| | | | |
|---|---|---|---|
| 7,143,177 B1 * | 11/2006 | Johnson et al. | 709/231 |
| 7,328,239 B1 * | 2/2008 | Berberian et al. | 709/204 |
| 2002/0123883 A1 | 9/2002 | Jackson et al. | |
| 2002/0188680 A1 * | 12/2002 | McCormack et al. | 709/204 |
| 2003/0002448 A1 * | 1/2003 | Laursen et al. | 370/261 |
| 2004/0103150 A1 * | 5/2004 | Ogdon et al. | 709/205 |
| 2004/0137887 A1 * | 7/2004 | Niemi | 455/416 |
| 2004/0196867 A1 * | 10/2004 | Ejzak et al. | 370/468 |
| 2004/0246332 A1 * | 12/2004 | Crouch | 348/14.08 |
| 2005/0058125 A1 * | 3/2005 | Mutikainen et al. | 370/354 |
| 2005/0071440 A1 * | 3/2005 | Jones et al. | 709/218 |
| 2005/0094621 A1 * | 5/2005 | Acharya et al. | 370/352 |
| 2005/0213739 A1 * | 9/2005 | Rodman et al. | 379/202.01 |
| 2005/0283536 A1 * | 12/2005 | Swanson et al. | 709/232 |
| 2006/0067500 A1 * | 3/2006 | Christofferson et al. | 379/202.01 |
| 2006/0200520 A1 * | 9/2006 | Vernon et al. | 709/204 |
| 2006/0239443 A1 * | 10/2006 | Oxford et al. | 379/406.01 |
| 2006/0262917 A1 * | 11/2006 | Marsico | 379/220.01 |
| 2007/0026852 A1 * | 2/2007 | Logan et al. | 455/422.1 |
| 2007/0217589 A1 * | 9/2007 | Martin et al. | 379/202.01 |
| 2007/0274492 A1 * | 11/2007 | Baker et al. | 379/202.01 |
| 2009/0310600 A1 * | 12/2009 | Kung et al. | 370/352 |

* cited by examiner

CONFERENCE BRIDGE SERVER

The invention is based on a priority application EP 06 291 250.6 which is hereby incorporated by reference.

TECHNICAL FIELD

The present invention relates to a method of establishing telephone conference calls, and a conference bridge server and a computer program product to execute said method.

BACKGROUND OF THE INVENTION

Conference calls play a significant role in today's business life. In conference calls, where some participants share a common conference room while other participants are at remote locations, the voice quality from participants speaking in the common conference room is often poor when using a standard conference phone with handsfree feature.

Professional conference rooms exist where each participant has their own input device, e.g., their own microphone, while audio output goes to a common room loudspeaker. In addition, conference systems are known that use desktop or laptop computers as audio and/or video terminals and that have a bridge server that can be configured to route output to a common output terminal such as a common conference phone.

WO 94/24803 describes a telecommunications network architecture which facilitates the handling of multimedia communications between any number of conference participants, who may have varying media communications capabilities involving one or more of audio, video, and data. A calling party and a called party meet each other in a virtual meeting room generated by the system. The telecommunications network architecture further comprises bridging resources to effectuate a mediation between different types of media.

EP 0 898 424 A2 describes a teleconferencing system for conducting a teleconference among a plurality of participants having workstations with monitors for displaying visual images and with associated audio-visual (AV) capture and reproduction capabilities for capturing and reproducing video images and spoken audio of participants. Furthermore, a common collaboration initiator exists for initiating a plurality of types of collaboration, e.g., data conferencing, telephone conferencing, video conferencing, etc. among the participants.

SUMMARY OF THE INVENTION

It is the object of the present invention to provide an improved conference call.

The object of the present invention is achieved by a conference bridge server for establishing a conference telephone call, the conference bridge server comprising input and output means for a plurality of communication connections connecting conference terminals with the conference bridge server and a conference core for distributing input signals from any of the conference terminals to at least some of the remaining conference terminals, wherein the conference bridge server comprises means for issuing a special address to be utilized by one or more participants at a first location using a common conference phone to connect one or more laptop computers as additional conference terminals, and wherein said conference core is adapted to distribute, in said conference call, input signals from conference terminals connected via said special address to conference terminals assigned to other participants at one or more other locations, but redirect output signals for conference terminals connected via said special address to said common conference phone. Moreover, the object of the present invention is achieved by method of providing a conference telephone call wherein said method comprises the steps of establishing a plurality of communication connections connecting conference terminals with a conference bridge server, and distributing input signals from one or more conference terminals to at least some of the remaining conference terminals, whereby the method comprises the further steps of utilizing a special address to connect one or more laptop computers as additional conference terminals, the one or more laptop computers assigned to one or more participants at a first location using a common conference phone, distributing, in said conference call, input signals from conference terminals connected via said special address to conference terminals assigned to other participants at one or more other locations, and redirecting output signals destined for conference terminals connected via said special address to said common conference phone. And the object of the present invention is further achieved by computer program product for establishing a conference telephone call with a plurality of communication connections connecting conference terminals with a conference bridge server and distributing input signals from one or more conference terminals to at least some of the remaining conference terminals, wherein the computer program product, when executed, performs the steps of issuing a special address to be utilized, by one or more participants at a first location using a common conference phone, to connect one or more laptop computers as additional conference terminals, distributing, in said conference call, input signals from conference terminals connected via said special address to conference terminals assigned to other participants at one or more other locations, and redirecting output signals destined for conference terminals connected via said special address to said common conference phone.

Participants in the common conference room use their laptop computers as input source, i.e., for providing audio input to the conference call. However, audio output is not directed to each participant's laptop computer but is directed to the conference phone in the common conference room. The idea is that the conference bridge server has some means to inform a participant of an address to connect his laptop as additional voice input means to the conference call system.

Each laptop computer is used as a microphone of a virtual conferencing phone wherein the detection of a speaking participant can be done as in a state-of-the-art audio conference. A conference call is created on the conference bridge server. A VoIP client on a laptop computer calls the conference bridge server (VoIP=Voice over Internet Protocol). However, only the microphone input from the participants is used by the conference bridge server and the audio output is sent to only one device, e.g., a speaker of the conference phone, in the common conference room shared by the participants. The participants in the common conference room call a specific number or use a specific access code so that the conferencing bridge is able to differentiate the microphones in the common conference room from the microphones in other locations.

With this method, each of the participants of a telephone conference is provided with an input means, e.g., a microphone, of their own. Each participant may use their laptop computer, which may be anyway used to take notes or review documents, as input means. Each laptop is used as a microphone of a virtual conferencing phone. Therefore, each participant can be heard equally well in a conference call.

The invention provides an elegant solution for the problem if there are more participants than microphones. By using laptop computers as individual microphones, the participants at a remote location can hear properly what is said in the common conference room because each participant is very close to his own microphone. Besides, there is no need that microphones of the hardware conferencing phone are passed around in the common conference room so that each speaker can be heard correctly.

A conferencing tool is able to differentiate input signals originating from microphones at a specific location from input signals originating from microphones at another location. Thus, parameters of echo cancellation may be optimized for the microphones at a specific location to prevent echo due to the mixed audio input and output. The availability of a separate microphone for each participant and the improved echo cancellation result in a better media quality at remote locations.

Moreover, the invention provides means to inform the participants of the conference call about who is currently speaking. Therefore, the participants may be provided with a list of all participants and an identification of a speaking participant.

In addition to that, the invention provides a solution for the case that there are more participants than audio input channels at the conferencing bridge or microphones. For this case the laptops may be provided with local mixing capabilities to act as a local audio mixing node.

Further advantages are achieved by the embodiments of the invention indicated by the dependent claims.

According to a preferred embodiment of the invention, the special address that is utilized by a participant to connect his laptop to the conference call is an address assigned to the conference bridge server. Preferably, the conference bridge server provides separate dial-in URLs for people at a first location, for the conference phone and people at a second location so that separate processing can be applied to the audio streams from and to each of the locations and the conference phone (URL=Universal Resource Locator). All participants willing to add their laptop to the virtual conference bridge dial the received URL as they would do for a "standard" dial-in conference.

According to another preferred embodiment of the invention, different echo cancellation parameters are applied to each participant in a common conference room in dependence on his/her microphone's relative position with regard to the common conference phone. In addition, also the distance of a participant to his microphone, i.e., laptop computer, may be taken into account for the choice of the echo cancellation parameters. That means that different echo cancellation parameters are applied to the input/output signal channels related to the conference call whereby the used echo cancellation parameters depend on the location of the participant or device associated to the signal channel. For example, if the common conference room is a very spacious room with a capacity of twenty conference participants and resounding acoustics, it is advantageous to apply different echo cancellation parameters to each of the participants in the common conference room because each of the participants will be located at a different distance from the common conference phone.

According to another preferred embodiment of the invention, the signalling and session initiation traffic is transmitted using the SIP protocol, and the control traffic associated with the transmission of media data is encoded in RTCP, while the media data are transmitted using RTP (SIP=Session Initiation Protocol; RTP=Realtime Transmission Protocol; RTCP=Realtime Transmission Control Protocol).

In a preferred embodiment, the conference bridge server is enabled to indicate a currently speaking participant. From the source fields of the SIP protocol, the conference bridge server can extract the names of the participants, and by means of voice detection such as VAD (=Voice Activity Detection), the conference bridge server can allocate to the speaking participant or group the extracted names and display them to the other participants. Preferably, the conference bridge server also holds a picture of each participant in a data base and displays the picture of a speaking participant to the other participants.

According to another preferred embodiment of the invention, the conference bridge server provides a participant with a special address in dependence on the location of the participant. The participant uses the received address to contact the conference bridge server. The conference bridge server recognizes the origin of an incoming signal by the address used to send the signal to the conference bridge server. Thus, the incoming signals and the related participants can be distinguished according to their location.

Preferably, all participants at a common location are provided with a common special address. The conference bridge server may send a conference form to the participants applying to join a conference call and require them to indicate their location. Thus, the conference bridge server has the information needed for building location-dependent groups. It is also possible that a participant receives the address of a website and that the participant retrieves the common special address from the website.

Preferably, the laptop computers comprise VoIP client software which enables the laptop computers to act as a local mixing entity. For instance, if there are more participants than can be accepted by the conference bridge server, an already connected laptop computer may accept one or more other laptop computers and act as a relay station to the conference bridge server. Thus, also the indirectly connected laptop computers can join the virtual conference phone.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF PREFERRED EMBODIMENTS

Figure 1:
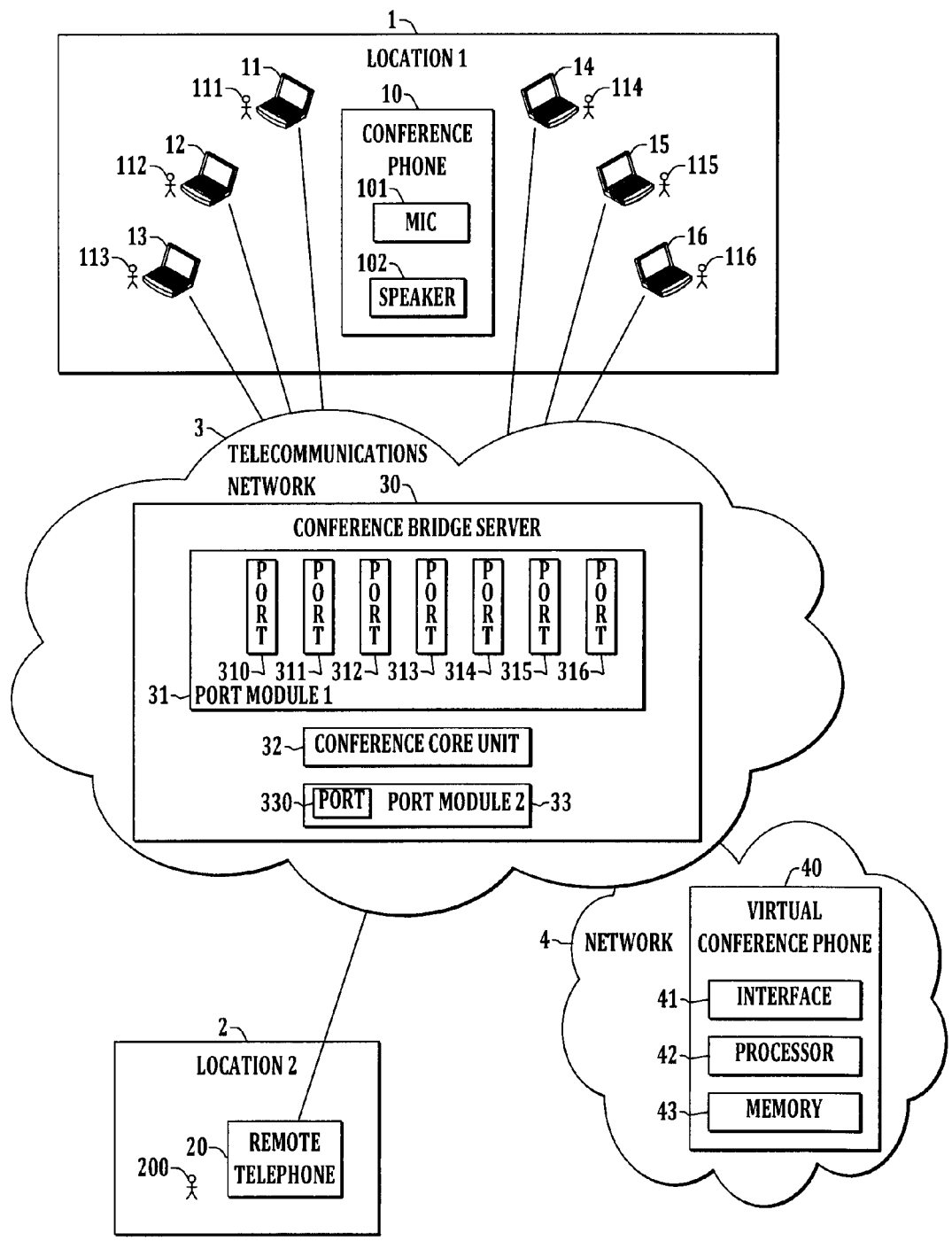
FIG. 1 is a block diagram of a conference call system according to an embodiment of the invention.

FIG. 1 shows a conference call system comprising a hardware conference phone 10 with multiple microphones 101 and a loudspeaker 102 at a first location 1, a telecommunications network 3 with a conference bridge server 30, a virtual conference phone unit 40 accessible via another network 4, and a remote telephone 20 at a second location 2. The virtual conference phone unit 40 may be provided and/or installed by a web server where web server here means web technology and not necessarily public internet location. The virtual conference phone unit 40 may be in the Internet but it may be found in a corporate network as well. Thus, the other network 4 may be the public Internet but it may be a corporate network.

The hardware conference phone 10 is used for a conference call by participants 111 to 116 at the first location 1. The participants 111 to 116 wish to communicate with another participant 200 using the remote telephone 20 at the second location 2. Each of the participants 111 to 116 has available their own respective laptop computer 11 to 16 which may be connected to the telecommunications network 3.

The multiple microphones 101 of the hardware conference phone 10 record the sounds from the participants 111 to 116. The loudspeaker 102 of the hardware conference phone 10 outputs the sounds from the remote telephone 20.

The conference bridge server 30 comprises a first port module 31 with seven ports 310 to 316 to provide connections to the hardware conference phone 10 and the laptop computers 11 to 16, a conference core unit 32, and a second port module 33 with a single port 330 providing a connection to the remote phone 20. The telecommunications network 3 is connected to the Internet 4 so that the conference bridge server 30 can communicate with the virtual conference phone unit 40. In the embodiment shown, the virtual conference phone unit 40 is implemented as a web application accessible by means of a web access.

The conference bridge server 30 may be composed of one or several interlinked computers, i.e., a hardware platform, a software platform basing on the hardware platform and several application programs executed by the system platform formed by the software and hardware platform. The functionalities of the server are provided by the execution of these application programs. The application programs or a selected part of these application programs constitute a computer software product providing a conference bridge service as described in the following, when executed on the system platform. Further, such computer software product is constituted by a storage medium storing these application programs or said selected part of application programs.

The virtual conference phone unit 40 comprises an interface 41 for exchanging data with external devices, a processor 42 for data processing and control of functions of the virtual conference phone unit 40, and a memory 43 for storing data. In another embodiment, the virtual conference phone unit 40 may be installed in the telecommunications network 3 and/or integrated into the conference bridge server 30.

The first location 1 may be a spacious conference room while the second location 2 may be a small office room. The terminals 11 to 16 may be situated at different distances to the loudspeaker 102 of the common conference phone 10. In addition to that, the participants 111 to 116 at the first location 1 may be situated at different positions to their terminals 11 to 16 and the recording quality of each microphone of the terminals 11 to 16 may vary, too. The conference bridge server 30, since it identifies each participant 111 to 116 at the first location 1 as a separate, individual participant, is able to supply an echo cancellation software with different echo cancellation parameters for each of the participating terminal 11 to 16, 20.

Figure 2:
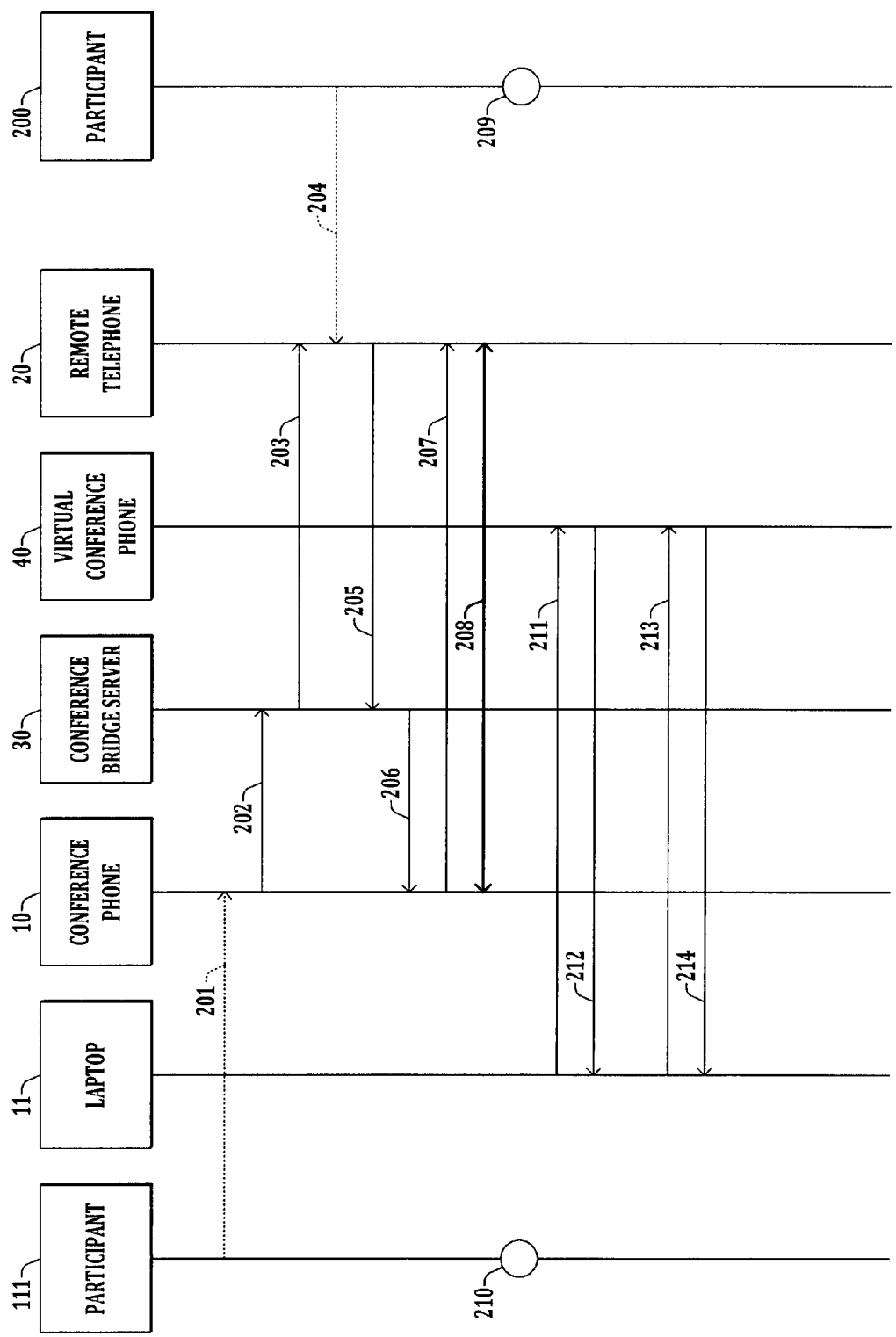
FIG. 2 is a message flow diagram related to a conference call according to an embodiment of the invention.

FIG. 2 shows data flows for establishing a conference call according to a preferred embodiment of the invention. A user 111 called Alice situated at location 1 wishes to call in a telephone call another user 200 called Charles situated at location 2. In a first step 201, Alice 111 dials at the conference phone 10 the telecommunication address assigned to Charles 200 or assigned to the phone 20 used by Charles 200. Preferably, a VoIP client is installed on the conference phone 10 and on Charles' phone 20.

If the telecommunications devices utilized for the conference call support SIP, the telecommunication address dialed by Alice 111 may be a SIP address such as "charles@example.net". The steps 202 to 207 represent the usual SIP call setup messages. First, the conference phone 10 sends an INVITE message 202 comprising the dialed address to the conference bridge server 30 which represents a SIP proxy. The conference bridge server 30, knowing the location of the phone 20 of Charles 200 from a registrar, forwards the INVITE message 203 to the phone 20 of Charles 200. When Charles 200 reacts to the indicated waiting call in step 204, e.g., by lifting the handset, his SIP user agent, i.e., the phone 20, sends a 200 OK message back to the conference phone 10 used by Alice 111. This is indicated by messages 205 and 206. Then, the conference phone 10 sends an ACK (=acknowledge) message 207 to the phone 20.

After completion of the SIP call setup messages 202 to 207, a communication connection 208 between Alice 111 and Charles 200 is established and media streams can be exchanged via RTP/RTCP. Therefore, Charles 200 is enabled to propose to Alice 111 in step 209 to use a virtual conference phone. In step 210, Alice 111 agrees with this proposal.

In step 211, Alice 111 uses her laptop computer 11 to log in at the virtual conference phone unit 40. A VoIP client software is installed on her laptop computer 11. In a preferred embodiment, the virtual conference phone unit 40 is implemented as a web application which may be contacted, e.g., via an HTTP address (HTTP=Hypertext Transfer Protocol). Therefore, Alice 111 may use a browser on her laptop 11 to reach the virtual conference phone unit 40 web application and apply for a virtual conference. In step 212, the virtual conference phone unit 40 presents a conference form to Alice 111. In step 213, Alice 111 fills in the conference form and, in particular, indicates that she sits in location 1, e.g., a specific conference room called "shared".

In step 214, the virtual conference phone unit 40 provides Alice 111 with an address, e.g., "sip:shared@example.net", to be used by Alice 111 to contact the virtual conference phone unit 40. For example, the address may be displayed on a display of her laptop 11 and Alice 111 may type the displayed address on her laptop keyboard. It is also possible that the virtual conference phone unit 40 provides Alice 111 also with an address, e.g., "sip:remote@example.net", to be used by Charles 200 to contact the virtual conference phone unit 40.

In another embodiment, the address not displayed to Alice 111 but is used internally in by an application, e.g., running on the laptop 11 of Alive 111, to dial the received address. Thus, Alice 111 is not required to type the address herself on the keyboard. This solution provides more comfort for the user.

In still another embodiment, the connection to the conference bridge 30 is not set up in the direction subscriber—conference bridge 30 but in the opposite direction conference bridge 30—subscriber. For example, the virtual conference phone unit 40 manages one or more different conference calls. A subscriber may log in into the virtual conference phone unit 40, select a conference call he wants to participate in and apply for participation, e.g., by clicking a pre-defined button. Then, the virtual conference phone unit 40 or another dedicated web/network application, knowing the address of the applying subscriber from his application messages, establishes a connection to the applying subscriber. Once the connection has been set up, the subscriber is registered as a participant of the selected conference call.

Generally, the virtual conference phone unit 40 provides separate addresses, e.g., dial-in URLs, for people at different locations. For example, the virtual conference phone unit 40 provides a separate dial-in URL for the participants 111 to 116 in the conference room 1, a separate dial-in URL for the conference phone 10, and a separate dial-in URL for the participant 200 in the remote location 2 so that separate processing can be applied to the audio streams from and to the conference room 1. This may be because of more strict echo cancellation processing. Then, all participants willing to add their laptop to the virtual conference phone dial the allocated URL as they would do for a "standard" dial-in conference.

Thus, a mixing of conference data takes place both in the conference phone 10 and in the conference bridge server 30.

In a preferred embodiment, the VoIP client software on each laptop can be set up to provide the name of the speaking participant or group of speakers to the conference bridge server. For instance, the display name of the "From" header field in a SIP INVITE message can transport the various names. Thus, the conference bridge server can provide each participant of the conference call with information on who is currently speaking.

Preferably, the conference bridge server performs voice detection and can display who or which group is speaking if the participants have a man machine interface to the conference bridge server.

The conference bridge server does not send back audio to each of the laptop computers in order to prevent various delay issues, e.g., that the laptops are not identical, that each laptop processes sound differently, such that the combined result may not be satisfactory, etc. Instead, the conference bridge server sends back audio only to the speaker of the hardware conferencing phone or to a single dedicated softphone.

Figure 3:
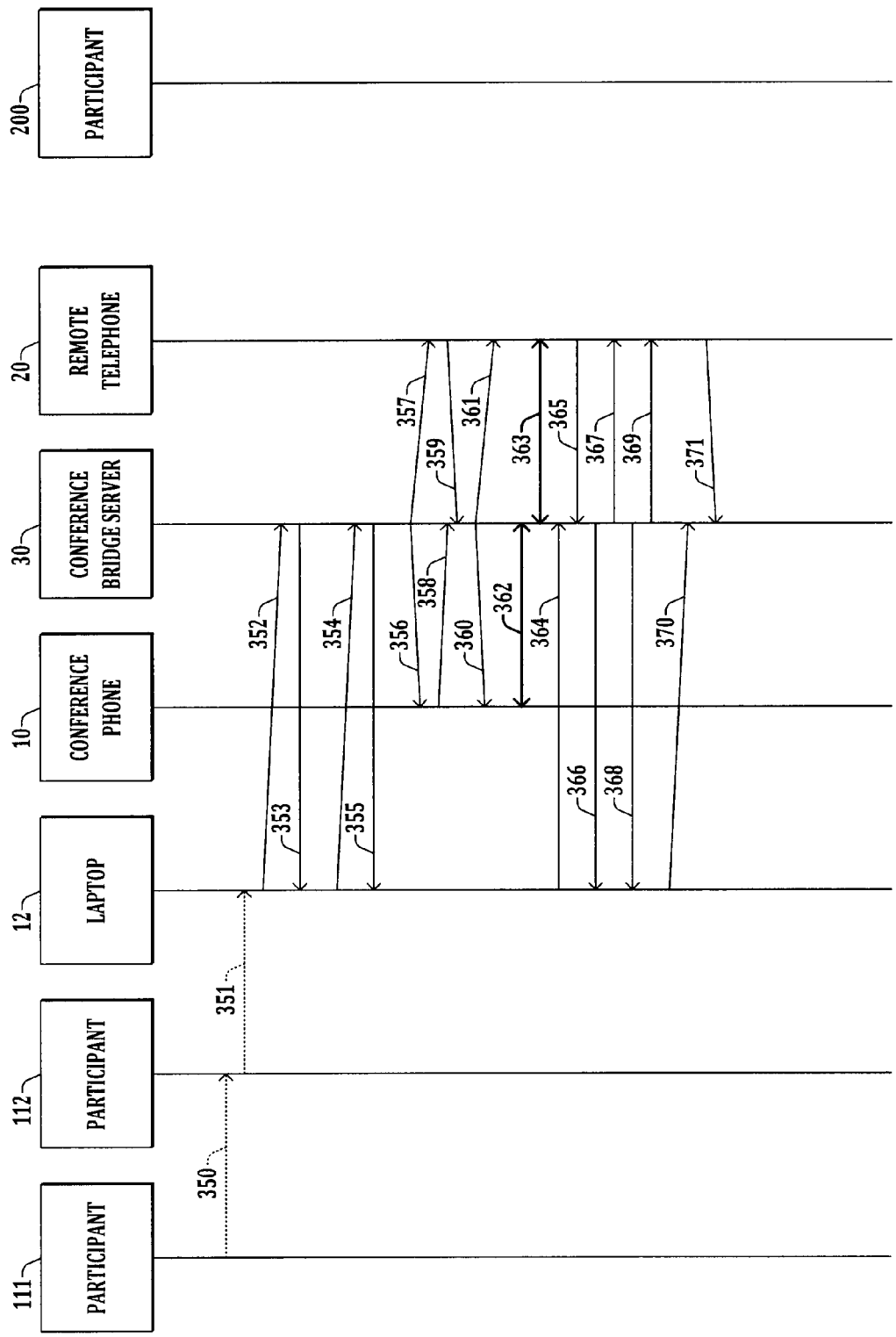
FIG. 3 is a message flow diagram related to a conference call according to another embodiment of the invention.

FIG. 3 shows data flows for establishing a conference call according to another preferred embodiment of the invention. The shown data flow start from a situation where, as described with reference to FIG. 2, Alice has been provided with an address to use for contacting the virtual conference phone. In the embodiment of FIG. 3, the virtual conference phone unit 40 is implemented within the conference bridge server 30. This means that the participants, when contacting the conference bridge server 30, at the same time can communicate with the virtual conference phone unit 40 without the need to address them separately.

FIG. 3 describes a situation where another participant 112 called Bob wants to join a conference call and is informed by Alice 111 about the relevant address of the virtual conference phone unit 40 installed in the conference bridge server 30. In step 350, Alice 111 tells Bob 112 the address of the virtual conference phone unit 40, e.g., "shared@example.net", to be used by the participants situated at the location 1, i.e., the conference room. In step 351, Bob 112 dials the received address at his laptop 12 to contact the virtual conference phone unit 40 installed in the conference bridge server 30. Preferably, Bob's laptop 12 comprises a SIP softphone which runs a virtual conference phone plug-in.

The steps 352 to 354 describe the usual SIP call setup messages. First, Bob's laptop 12 sends an INVITE message 352 comprising the dialed address to the conference bridge server 30 which represents the final destination of the INVITE message 352. The conference bridge server 30 reacts to the INVITE message 352 by sending a 200 OK message 353 back to Bob's laptop 12. Then, Bob's laptop 12 sends an ACK message 354 to the conference bridge server 30.

After completion of the SIP call setup messages 352 to 354, a communication connection 355 between Bob 112 and the conference bridge server 30 is established and media streams can be exchanged via RTP/RTCP.

In the following steps 356 and 357, the conference bridge server 30 sends an INVITE message 356 to the conference phone 10 and an INVITE message 357 to Charles' phone 20. The conference phone 10 replies a 200 OK message 358 to the conference bridge server 30, and Charles' phone 20 replies a 200 OK message 359 to the conference bridge server 30. Then, the conference bridge server 30 sends an ACK message 360 to the conference phone 10 and an ACK message 361 to Charles' phone 20. After reception of the ACK messages 360 and 361, a communication connection 362 between the conference phone 10 and the conference bridge server 30 and a communication connection 363 between Charles' phone 20 and the conference bridge server 30 are established.

In another embodiment, it is also possible that the steps 352 to 355 and the steps 356 to 363 are executed contemporaneously.

In the steps 364 to 371, the participants Bob 112 and Charles 200 subscribe to the conference call. This is done by sending a SUBSCRIBE conference message 364 from Bob's laptop 12 to the conference bridge server 30 and a SUBSCRIBE conference message 365 from Charles' telephone 20 to the conference bridge server 30. Usually, the SIP SUBSCRIBE message is used to subscribe to resource or call state for various resources or calls in a network. The conference bridge server 30 answers by sending 200 OK messages 366 and 367 to Bob's laptop 12 and to Charles' telephone 20. After that, SIP NOTIFY messages 368 and 369 are sent from the conference bridge server 30 to Bob's laptop 12 and to Charles' telephone 20. The NOTIFY messages 368 and 369 return current state information and comprise identifiers of the participants of the conference call, i.e., of the conference phone 10, of Charles 200 and his telephone 20, respectively, and of Bob 112 and his laptop 12, respectively. Bob's laptop 12 and Charles' phone 20 answer by sending 200 OK messages 370 and 371.

Figure 4:
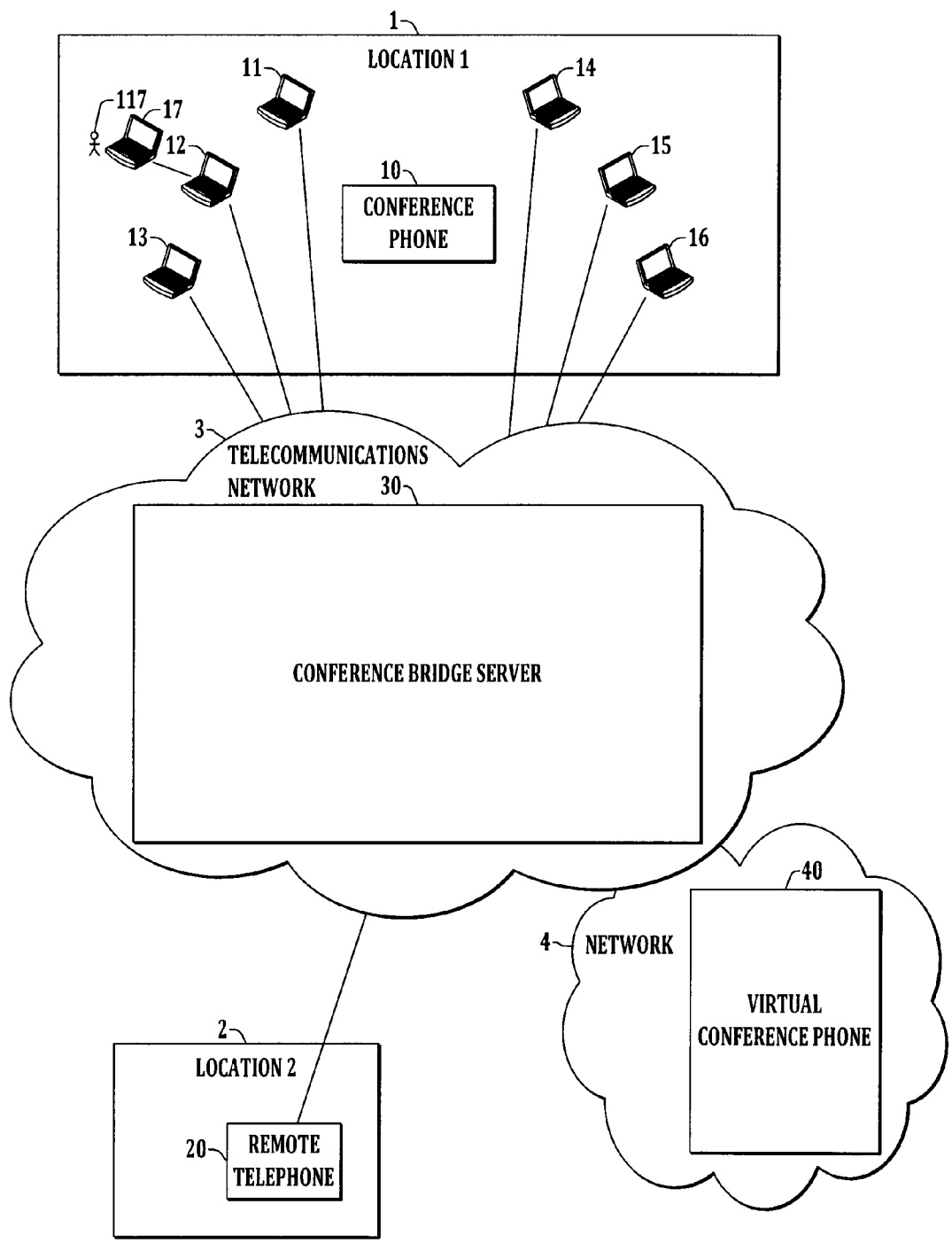
FIG. 4 is a block diagram of a conference call system according to still another embodiment of the invention.

FIG. 4 shows a constellation where all conference ports of the conference bridge server 30 are used by the participants 111 to 116 using the computer laptop devices 11 to 16 and by the conference phone 10. If an additional participant 117 using a computer laptop 17 also wants to join the conference call at the conference room location 1, a suitable mechanism is used where the VoIP client software is extended with local mixing capabilities on the laptop. This mechanism, which can be implemented with basic SIP if the VoIP client software is a standard SIP softphone and if the conference bridge server supports SIP, is explained in the following.

Figure 5:
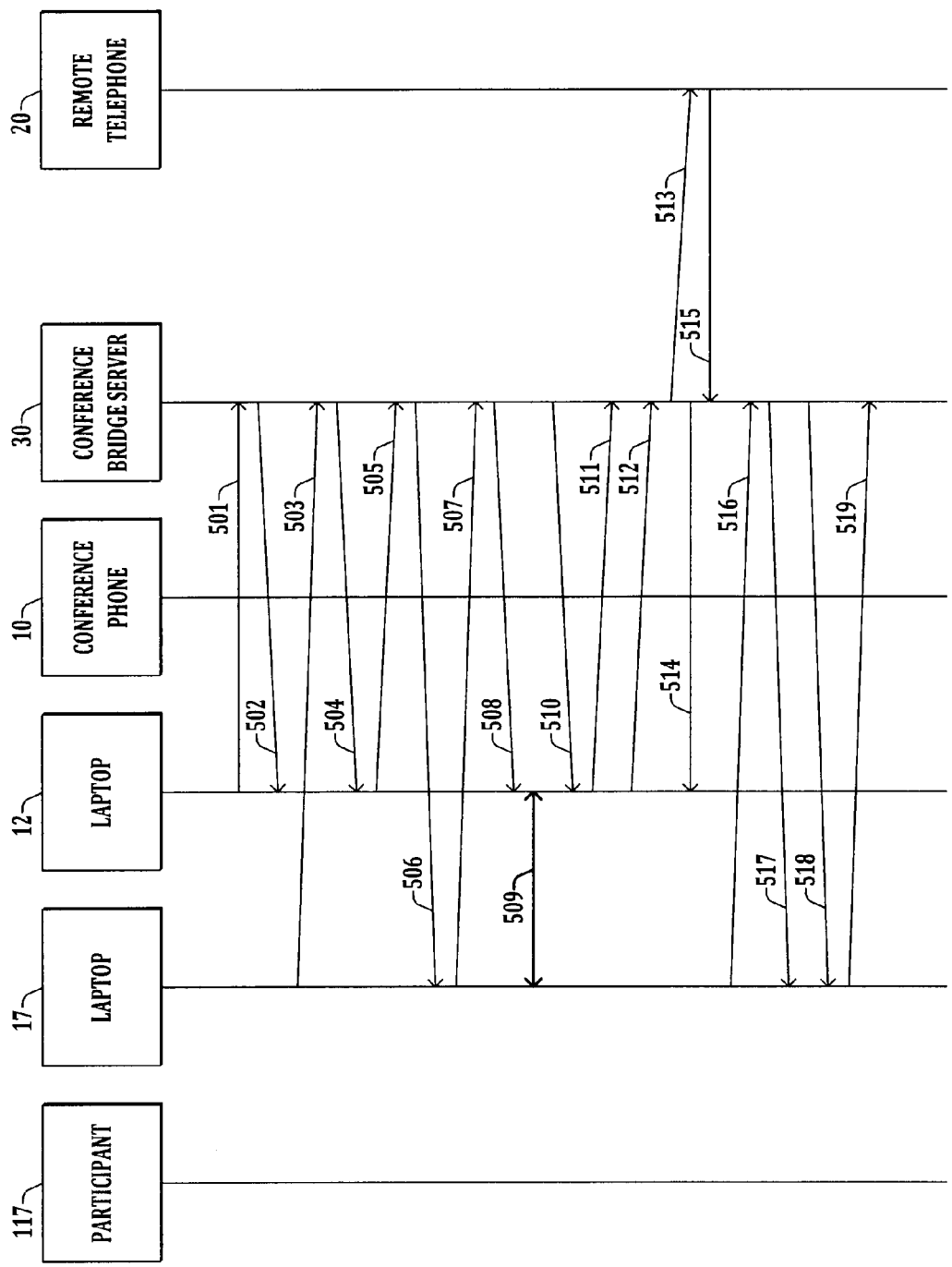
FIG. 5 is a message flow diagram related to a conference call according to still another embodiment of the invention.

FIG. 5 shows a situation where participant Bob's SIP softphone 12 runs a virtual conference phone plug-in and is in a conference with the conference phone 10 and Charles' device 20. This is indicated by the messages 501 and 502.

Then an additional participant called Daniel 117 using the computer laptop 17 walks in location 1 and connects the computer laptop 17 utilizing a SIP softphone software to "shared@example.net", i.e., the address to be utilized by participants at location 1 to join the conference call. Daniel 117 dials the address "shared@example.net" on his laptop 17 and Daniel's laptop 17 sends an INVITE message 503 comprising the dialed address "shared@example.net" to the conference bridge server 30.

The conference bridge server 30 sends an INVITE message 504 addressed to Bob's address, e.g., "bob@example.net" to Bob's laptop 12. The INVITE message 504 carries in the destination field "To:" the address of the on-going conference, i.e., "shared@example.net". Bob's laptop 12 answers with a 200 OK message 505. Then, the conference bridge server 30 sends a 200 OK message 506 to Daniel's laptop 17. Daniel's laptop 17 answers with an ACK message 507 to the conference bridge server 30. The conference bridge server 30 sends an ACK message 508 to Bob's laptop 12. After the ACK message 508 has been received, a communication connection 509 between Daniel's laptop 17 and Bob's laptop is established.

In step 510, the conference bridge server 30 sends a SUBSCRIBE conference message to Bob's laptop 12. Bob's Laptop 12 answers by sending a 200 OK message 511 to the conference bridge server 30. Then, a NOTIFY message 512 comprising identifiers of the conference bridge server 30, of Daniel 117 and his laptop 17, respectively, and of Bob 112 and his laptop 12, respectively, is sent from from Bob's laptop 12 to the conference bridge server 30. The conference bridge server 30 is the only entity which knows all participants of the conference phone. Thus, the conference bridge server 30 sends a NOTIFY message 513 comprising identifiers of the conference phone 10, of Charles, Bob, and Daniel 117 and their laptops 20, 12, and 17, respectively, to Charles's laptop 20. Additionally, the conference bridge server 30 sends a 200 OK message 514 to Bob's laptop 12. Charles' laptop 20 replies to the received notification 513 by sending a 200 OK message 515 to the conference bridge server 30.

Then, Daniel's laptop 17 sends a SUBSCRIBE conference message 516 to the conference bridge server 30 which is answered by the conference bridge server 30 with a 200 OK message 517 sent to Daniel's laptop 17. Next, the conference bridge server sends a notification message 518, i.e., a NOTIFY message comprising identifiers of the conference phone 10, of Charles, Bob, and Daniel 117 and their laptops 20, 12, and 17, respectively, to Daniel's laptop 17. Daniel's laptop 17 answers by sending a 200 OK message 519 back to the conference bridge server 30.

Thus, a mixing of conference data takes place both in Bob's laptop 12, the conference phone 10 and in the conference bridge server 30.

Figure 6:
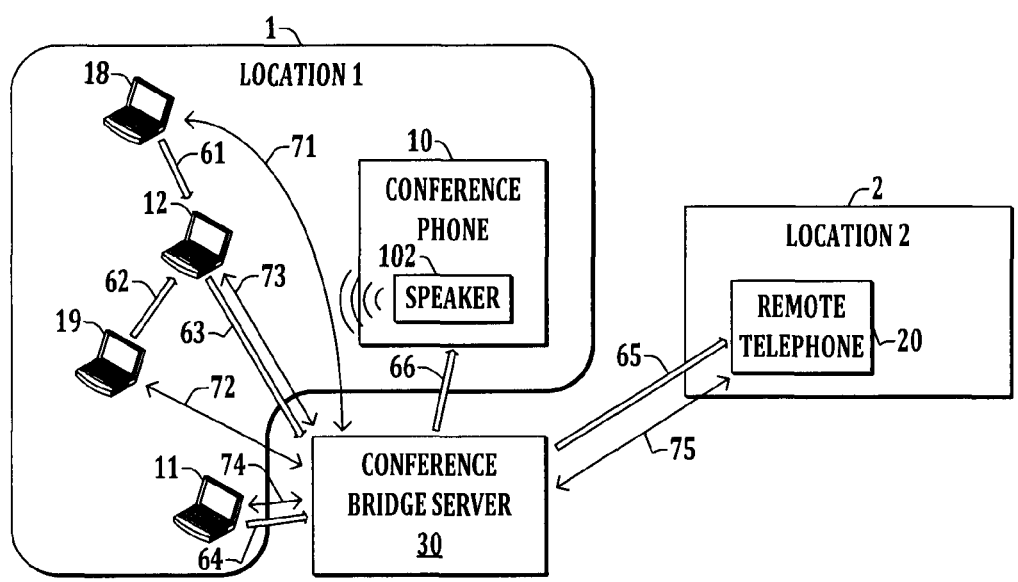
FIG. 6 is a schematic diagram specifying the data flows and related signalling and control traffic flows according to a preferred embodiment.

FIG. 6 shows that a laptop computer at a location can be used as a relay station for other laptop computers at the same location. FIG. 6 shows laptop computers 11, 12, 18, 19 of participants using a common conference phone 10 at a first location 1 for conducting a conference call with a terminal 20 of another participant at a second location 2, and a conference bridge server 30 comprising a virtual conference phone. In the diagram, stream data is drawn as a double-lined arrow, signalling and/or control traffic associated with and required for the transmission of said stream data is drawn as a single-lined arrow. Stream data in the sense of this invention denotes streaming data such as audio data, video data, etc.

The laptop computers 11 and 12 are directly logged in at the conference bridge server 30 for the transmission of both stream traffic 63, 64 and signalling traffic 73, 74. Likewise, the terminal 20 is directly logged in at the conference bridge server 30 for the transmission of both stream traffic 65 and signalling traffic 75. Output stream data 66 destined for the laptop computers 11 and 12 is not transmitted to the laptop computers 11 and 12 but is transmitted to the common conference phone 10 where it is delivered, by means of a loudspeaker 102, to the participants associated with the laptop computers 11 and 12.

The laptop computers 18 and 19, however, are only logged in at the conference bridge server 30 in a limited manner. The stream data 61, 62 originating from the laptop computers 18 and 19 is not sent directly to the conference bridge server 30 but is sent to the conference bridge server 30 via the laptop computer 12 serving as a relay station. The reason may be, e.g., that there are not enough audio ports at the conference bridge server 30 to allow the direct connection of the laptops 18 and 19. As far as signalling data traffic is concerned, the laptops 18 and 19 directly exchange signalling traffic 72, 73 with the conference bridge server 30 and do not use the laptop computer 12 as relay station.

The invention claimed is:

1. A conference bridge server for establishing a conference telephone call, the conference bridge server comprising an input and output port for a plurality of communication connections connecting conference terminals with the conference bridge server and a conference core for distributing input signals from conference terminals to at least some of the remaining conference terminals, wherein the conference bridge server comprises a platform for issuing a special address utilizable by a plurality of participants at a first location using a common conference phone to connect a plurality of laptop computers as additional conference terminals, and wherein said conference core is adapted to distribute, in said conference call, input signals from conference terminals connected via said special address to conference terminals assigned to other participants at one or more other locations, but redirect output signals for conference terminals connected via said special address to said common conference phone.

2. The conference bridge server of claim 1, wherein the conference bridge server is operative to issue a common special address to all participants at a specific location.

3. The conference bridge server of claim 1, wherein the conference bridge server comprises is operative to provide the participants at the first location using the common conference phone with a common special address associated with the conference bridge server and the other participants at one or more other locations with one or more other special addresses associated with the conference bridge server for separate processing of the respective input and output signals.

4. The conference bridge server of claim 1, wherein the communication traffic between the conference bridge server and the conference terminals assigned to the participants is conducted using the session initiation protocol and the real-time transport protocol/real-time transport control protocol.

5. The conference bridge server of claim 1, wherein the conference bridge server is operative to detect a speaking participant at the first location and to utilize this information for controlling the conference call.

6. The conference bridge server of claim 1, wherein the conference bridge server is adapted to apply different echo cancellation parameters to said input signals received from said laptop computers dependent on a position of the one or more laptop computers relative to the common conference phone and/or dependent on a position of the participants at the first location relative to the one or more laptop computers.

7. The conference bridge server of claim 1, wherein the conference bridge server is operative to receive identification information of the participants at the first location and to indicate a name or another identification information of the current speaker to the other participants of the conference call.

8. A method of providing a conference telephone call, the method comprising:

establishing a plurality of communication connections connecting conference terminals with a conference bridge server;

distributing input signals from conference terminals to at least some of the remaining conference terminals;

utilizing a special address to connect a plurality of laptop computers as additional conference terminals, the plurality of laptop computers being assigned to a plurality of participants at a first location using a single common conference phone;

distributing, in said conference call, input signals from conference terminals connected via said special address to conference terminals assigned to other participants at one or more other locations; and redirecting output signals destined for conference terminals connected via said special address to said common conference phone.

9. The method of claim 8, further comprising:

using a relay function implemented in a laptop computer of one of the participants using the common conference phone to connect one or more laptop computers of one or more other participants at the first location using the common conference phone to the conference call through said laptop computer serving as a relay; and routing stream traffic from the one or more relayed laptop computers through said relay laptop computer to the conference bridge server and routing signalling for control of the conference call directly to the conference bridge server under avoidance of the relay laptop computer.

10. A computer program product for establishing a conference telephone call with a plurality of communication connections connecting conference terminals with a conference bridge server and distributing input signals from conference terminals to at least some of the remaining conference terminals, wherein the computer program product comprises a non-transitory computer readable media with computer-executable instructions for performing the steps of:

issuing a special address to be utilized, by a plurality of participants at a first location using a common conference phone, to connect a plurality of laptop computers as additional conference terminals;

distributing, in said conference call, input signals from conference terminals connected via said special address to conference terminals assigned to other participants at one or more other locations; and redirecting output signals destined for conference terminals connected via said special address to said common conference phone.

\* \* \* \* \*